US011767028B2

(12) United States Patent
Zhang et al.

(10) Patent No.: US 11,767,028 B2
(45) Date of Patent: Sep. 26, 2023

(54) CHANGE DETECTION CRITERIA FOR UPDATING SENSOR-BASED REFERENCE MAPS

(71) Applicant: Aptiv Technologies Limited, St. Michael (BB)

(72) Inventors: Kai Zhang, Carmel, IN (US); Walter K. Kosiak, Kokomo, IN (US)

(73) Assignee: Aptiv Technologies Limited, St. Michael (BB)

( * ) Notice: Subject to any disclaimer, the term of this patent is extended or adjusted under 35 U.S.C. 154(b) by 87 days.

(21) Appl. No.: 17/182,057

(22) Filed: Feb. 22, 2021

(65) Prior Publication Data

US 2022/0185316 A1 Jun. 16, 2022

Related U.S. Application Data

(60) Provisional application No. 63/124,512, filed on Dec. 11, 2020.

(51) Int. Cl.
*B60W 60/00* (2020.01)
*B60W 50/06* (2006.01)
(Continued)

(52) U.S. Cl.
CPC .......... *B60W 60/001* (2020.02); *B60W 50/06* (2013.01); *G05D 1/0221* (2013.01);
(Continued)

(58) Field of Classification Search
CPC ........ G06N 3/08; G06N 20/00; G06N 3/0454; G06N 5/003; G06N 3/02; G06N 00/00;
(Continued)

(56) References Cited

U.S. PATENT DOCUMENTS 6,560,529 B1    5/2003   Janssen et al.
7,603,208 B2   10/2009   Garceau et al.
(Continued)

FOREIGN PATENT DOCUMENTS

WO   WO-2016187472 A1 * 11/2016 ............. G06F 16/00

OTHER PUBLICATIONS

Furukawa, et al., "Self-supervised Simultaneous Alignment and Change Detection", Oct. 2020, pp. 6025-6031.
(Continued)

*Primary Examiner* — Yuen Wong
*Assistant Examiner* — Carville Albert Hollingsworth, IV
(74) *Attorney, Agent, or Firm* — Sawtooth Patent Group PLLC

(57) ABSTRACT

This document describes change detection criteria for updating sensor-based maps. Based on an indication that a registered object is detected near a vehicle, a processor determines differences between features of the registered object and features of a sensor-based reference map. A machine-learned model is trained using self-supervised learning to identify change detections from inputs. This model is executed to determine whether the differences satisfy change detection criteria for updating the sensor-based reference map. If the change detection criteria is satisfied, the processor causes the sensor-based reference map to be updated to reduce the differences, which enables the vehicle to safely operate in an autonomous mode using the updated reference map for navigating the vehicle in proximity to the coordinate location of the registered object. The map can be updated contemporaneously as changes occur in the environment and without hindering performance, thereby enabling real-time awareness to support controls and to improve driving-safety.

20 Claims, 13 Drawing Sheets

(51) Int. Cl.
*G05D 1/02* (2020.01)
*G08G 1/09* (2006.01)

(52) U.S. Cl.
CPC .............. *G05D 1/0274* (2013.01); *G08G 1/09* (2013.01); *B60W 2420/52* (2013.01); *G05D 1/0238* (2013.01); *G05D 1/0257* (2013.01)

(58) Field of Classification Search
CPC ......... G06N 3/0675; G05D 2201/0213; G05D 1/0088; G05D 1/0221; G05D 1/0274; G05D 1/0231; G05D 1/0278; G05D 2201/0212; G05D 1/0236; G05D 1/0242; G05D 1/0251; G05D 1/0257; G05D 1/028; G05D 1/0276; G05D 1/0238; G01C 21/32; G01C 21/30; G01C 21/3815; G01C 21/3859; G01C 21/3492; G01C 21/3848; G01C 21/3837; G01C 21/3841; G01C 21/34; G01C 21/3804; G01C 21/3844; G01C 21/3885; G06V 20/58; G06V 10/50; G06V 10/82; G06V 20/56; G06V 10/70; G06K 9/627; G06K 9/6272; G06K 9/6256; G06K 9/6262; B60W 60/001; B60W 2556/40; B60W 2420/52; B60W 40/04; B60W 40/06; B60W 50/06; G01S 17/89; G01S 17/10; G01S 17/42; G01S 17/86; G01S 19/393; G01S 17/894; H04W 4/44; H04W 4/024; G06F 17/18; G06F 16/29; G06F 30/27; G06T 2207/30252; G06T 7/74; G06T 2207/20081; G06T 2207/20084; G06T 2207/20096; G08G 1/09; G05B 2219/39298; G05B 2219/40408; G05B 13/00; B60L 2260/46; B60L 2260/50

See application file for complete search history.

(56) References Cited

U.S. PATENT DOCUMENTS

| 8,520,940 | B1 | 8/2013 | Schpok et al. |
| 8,559,673 | B2 | 10/2013 | Fairfield et al. |
| 9,129,163 | B2 | 9/2015 | Chen |
| 9,321,461 | B1 | 4/2016 | Silver et al. |
| 2019/0014733 | A1* | 1/2019 | Arditi ...................... G06N 3/08 |
| 2019/0080203 | A1* | 3/2019 | Zhang ..................... G06T 7/248 |
| 2019/0147320 | A1* | 5/2019 | Mattyus ................. G06V 10/82 382/155 |
| 2019/0147331 | A1* | 5/2019 | Arditi ..................... G06N 20/00 706/20 |
| 2020/0043478 | A1* | 2/2020 | Lee .......................... G10L 15/16 |

OTHER PUBLICATIONS

Jiang, et al., "ConvBERT: Improving BERT with Span-based Dynamic Convolution", Nov. 12, 2020.
Lechner, et al., "Neural circuit policies enabling auditable autonomy", Oct. 2020, pp. 642-652.
Li, "An Aircraft Detection Framework Based on Reinforcement Learning and Convolutional Neural Networks in Remote Sensing Images", Feb. 2018, 19 pages.
Li, et al., "Towards Safe Weakly Supervised Learning", Jun. 2019, 13 pages.
Luppino, et al., "Code-Aligned Autoencoders for Unsupervised Change Detection in Multimodal Remote Sensing Image", Apr. 15, 2020, 10 pages.
LV, et al., "Deep Learning and Superpixel Feature Extraction based on Sparse Autoencoder for Change Detection in SAR Images", Oct. 2018, pp. 5530-5538.
Niu, et al., "A Conditional Adversarial Network for Change Detection in Heterogeneous Images", Sep. 2018, pp. 45-49.
Pauls, et al., "Can we trust our maps? an evaluation of road changes and a dataset for map validation", Nov. 2018, 2639-2644.
Wang, et al., "A Deep Siamese Network with Hybrid Convolutional Feature Extraction Module for Change Detection Based on Multi-sensor Remote Sensing Images", Jan. 2020, 18 pages.
Wen, et al., "A deep learning framework for road marking extraction, classification and completion from mobile laser scanning point clouds", Jan. 2019, pp. 178-192.
Wiratama, et al., "Dual-Dense Convolution Network for Change Detection of High-Resolution Panchromatic Imagery", Oct. 2018, 13 pages.
Yang, "Transferred Deep Learning-Based Change Detection in Remote Sensing Images", Apr. 2019, pp. 6960-6973.
"Extended European Search Report", EP Application No. 21209136.7, May 4, 2022, 9 pages.

* cited by examiner

CHANGE DETECTION CRITERIA FOR UPDATING SENSOR-BASED REFERENCE MAPS

CROSS-REFERENCE TO RELATED APPLICATION

This application claims the benefit under 35 U.S.C. 119(e) of U.S. Provisional Application No. 63/124,512, filed Dec. 11, 2020, the disclosure of which is incorporated in its entirety by reference herein.

BACKGROUND

Some automotive systems rely on reference maps for autonomous or semi-autonomous driving. For example, when operating in extreme conditions, like at night on a dimly lit road, radars can be useful sensors that convey, as features in a reference map, vegetation, embankments, bridge expansions, manholes, or other obstacles. Reliance on these reference maps, which are derived from sensor data, can lead to safe driving decisions being made by systems that operate vehicles or vehicle fleets. Curator feedback (e.g., from humans or machines) and quality assurances may be used to ensure maps stay up to date. Automating updates to contemporaneously capture changes as they happen in the real-world promotes a higher degree of driving safety. Difficulty in this automation comes from attempting quick and accurate identifications of so-called "change detections" within an environment. Change detections are markers or indicators within sensor data, which correspond to identifiable, or missing, features of a reference map of that environment. Some systems may analyze camera imagery (e.g., airborne, infrastructure) or other sensor data to help identify change detections and automatically trigger reference-map updates. However, these automation attempts tend to fail or are too cumbersome to be relied on, especially when trying to update for any possible change detection that may happen, reliance on which not only slows performance but may also hinder driving-safety.

SUMMARY

This document describes change detection criteria for updating sensor-based maps. In one example, a method includes receiving, from a sensor device of a vehicle, an indication that a registered object is detected in proximity to the vehicle, and determining, by a processor of the vehicle, based on the indication, differences between features of the registered object and features of a sensor-based reference map, the features of the sensor-based reference map comprising a map location that corresponds to a coordinate location of the registered object. The method further includes executing, by the processor, a machine-learned model that is trained using self-supervised learning to identify change detections from inputs to the model, whether the differences satisfy change detection criteria for updating the sensor-based reference map, and responsive to determining that the differences satisfy the change detection criteria, causing, by the processor, the sensor-based reference map to be updated to reduce the differences. The method additionally includes causing, by the processor, the vehicle to operate in an autonomous mode that relies on the sensor-based reference map for navigating the vehicle in proximity to the coordinate location of the registered object.

This document also describes a system comprising a processor configured to perform this and other methods set forth herein, as well as computer-readable storage media, including instructions that, when executed, cause a processor to perform this and the other methods set forth herein. In addition, this document describes other systems configured to perform the above-summarized method and the other methods set forth herein.

This Summary introduces simplified concepts of change detection criteria for updating sensor-based maps, which are further described below in the Detailed Description and Drawings. This Summary is not intended to identify essential features of the claimed subject matter, nor is it intended for use in determining the scope of the claimed subject matter. That is, one advantage provided by the described change detection criteria is in quickly and accurately identifying change detections from sensor data, which are relied on to trigger an update to a map. Although primarily described in the context of radar based maps, and language-based self-supervised learning methods, the change detection criteria for updating sensor-based maps described herein can be applied to other sensor-based reference maps (e.g., lidar-based, image-based) where it is desirable to improve accuracy in navigation and control while still conserving processing resources and maintaining a map to be up to date, and other self-supervised learning methods beyond language-based methods may be used.

BRIEF DESCRIPTION OF THE DRAWINGS

The details of one or more aspects of change detection criteria for updating sensor-based maps are described in this document with reference to the following figures:

FIG. 1-2 illustrates an example process for using change detection criteria to update sensor-based maps, in accordance with techniques of this disclosure;

FIG. 1-3 illustrates an example vehicle system that uses change detection criteria to update sensor-based maps, in accordance with techniques of this disclosure.

FIGS. 2-1 and 2-2 illustrate example scenarios for using change detection criteria for updating sensor-based maps, in accordance with techniques of this disclosure;

FIG. 3 is a conceptual diagram illustrating adversarial matching as part of using change criteria for updating sensor-based maps, in accordance with techniques of this disclosure;

FIGS. 4-1 and 4-2 illustrate an example of a common-sense engine for using change detection criteria to update sensor-based maps, in accordance with techniques of this disclosure;

FIGS. 6-1, 6-2, 7-1, 7-2, 8-1, 8-2, 9-1, and 9-2 illustrate additional example scenarios for using change detection criteria for updating sensor-based maps, in accordance with techniques of this disclosure.

The same numbers are often used throughout the drawings to reference like features and components.

DETAILED DESCRIPTION

Overview

There can be difficulty in automating identification of change detections for updating sensor-based maps. In contrast to other ways that reference maps are updated, this document describes using change detection criteria for updating sensor-based maps. Based on an indication that a registered object is detected near a vehicle, a processor determines differences between features of the registered object and features of a sensor-based reference map. A machine-learned model is trained using self-supervised learning to identify change detections from inputs. This model is executed to determine whether the differences satisfy change detection criteria for updating the sensor-based reference map. If the change detection criteria is satisfied, the processor causes the sensor-based reference map to be updated to reduce the differences, which enables the vehicle to safely operate in an autonomous mode using the updated reference map for navigating the vehicle in proximity to the coordinate location of the registered object. The map can be updated contemporaneously as changes occur in the environment and without over-updating for changes that should not be reflected in the environment, thereby enabling better real-time awareness to aid in control and improve driving-safety.

The techniques of this disclosure, therefore, enable a self-supervised learning approach to creating criteria to be applied when determining whether a change detection is sufficient to cause a map update. The commonsense engine, which is a machine-learned model, evaluates each change detection for differences in features or attributes that warrant a map update. Through self-supervised learning techniques, the commonsense engine learns, and constructs change detection criteria. The criteria represent a knowledge repository enabling the commonsense engine to answer natural language and point cloud-based questions about observed phenomena in pretext tasks. Unlike other techniques for identifying change detections, the commonsense engine can quickly and accurately process point cloud data that has rich associated features, not only in a geographic layer, but in a semantic layer (e.g., for safety), as well. This way, when a road geometric change or traffic object change is detected in sensor data relative to a sensor-based reference map, the commonsense engine operates using real-time criteria for detecting roundabout types, construction closures, erosion, and other features that may be missing from the reference map because the features were not visible or not present when the map was created.

EXAMPLE ENVIRONMENT

Figure 1:
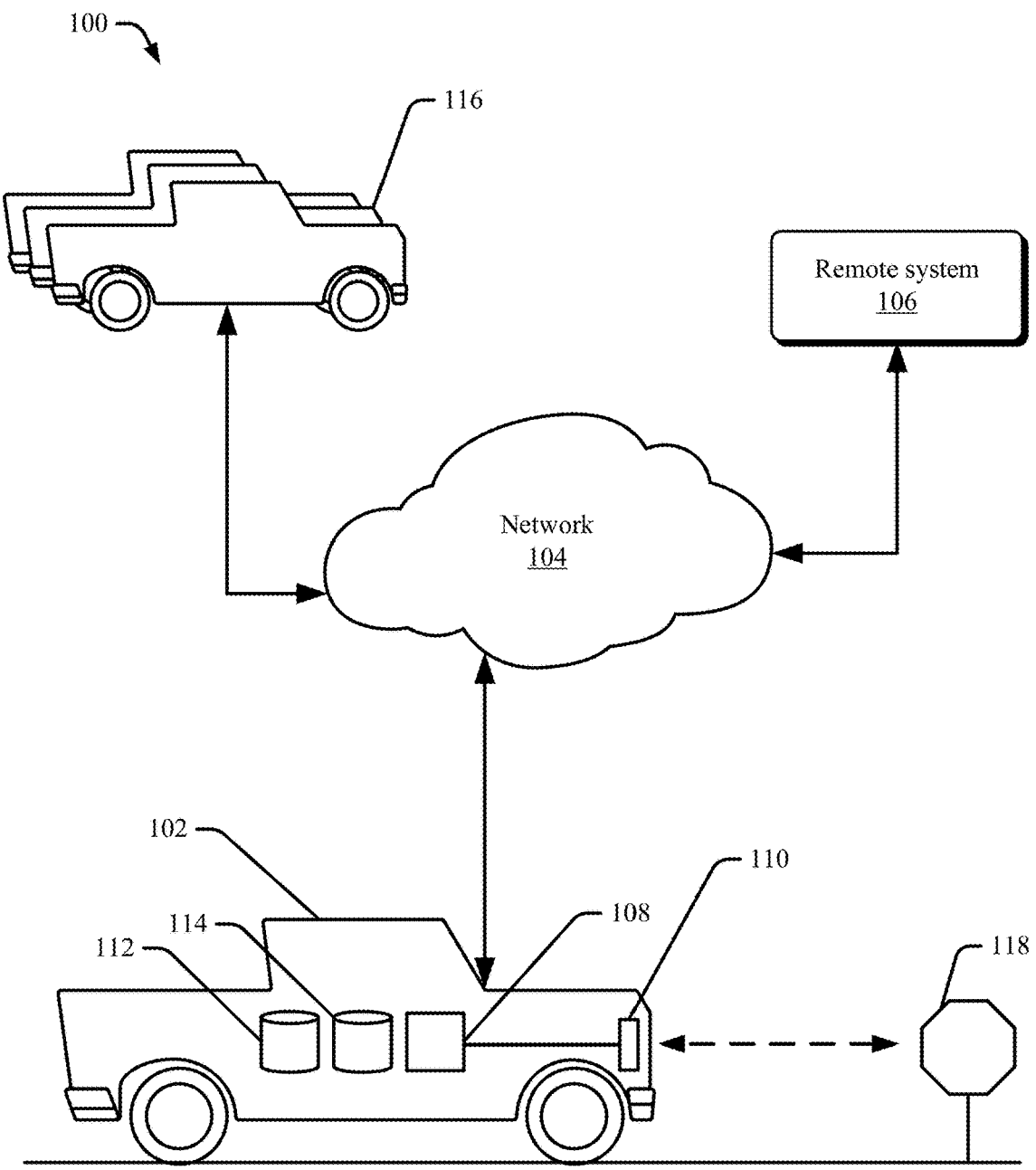
FIG. 1-1 illustrates an example environment in which change detection criteria are used for updating sensor-based maps, in accordance with techniques of this disclosure.

FIG. 1-1 illustrates an example environment 100 in which change detection criteria are used for updating sensor-based maps, in accordance with techniques of this disclosure. The environment 100 includes a vehicle 102, a network 104 (e.g., the Internet), a remote system 106 (e.g., a server), and a plurality of other vehicles 116. Change detection criteria may be used by one or more of the entities shown in the environment 100 for updating sensor-based maps used for autonomous or semi-autonomous vehicle navigation and vehicle control. The below described techniques may be performed at the remote system 106 through communicating with the vehicle 102 over the network 104. The plurality of other vehicles 116 may perform similar techniques, for example, executing a machine-learned model trained to identify change detection criteria. Likewise, the vehicle 102 may execute a model that does the same for updating sensor-based reference maps.

The vehicle includes a processor 108 (or other similar control circuitry) operatively coupled to a sensor device 110. As some examples, the sensor device 110 is illustrated as including camera(s) 110-1 (e.g., optical, infrared), location sensor(s) 110-2 (e.g., positioning system, accelerometer, barometer), and range/range-rate sensor(s) 110-3, such as radar, lidar, and ultrasound. The sensor devices 110 generate the sensor data 112 that the processor 108 analyzes for change detections.

The sensor device 110 is configured to identify and report to the processor 108, an indication of a registered object 118 that is identifiable in a field-of-view. An indication of the registered object 118 may be stored as sensor data 112. The sensor data 112 is compared against a sensor-based reference map 114 to enable the vehicle 102 to self-navigate safely, and in some cases, in close proximity to the registered object 118. The sensor-based reference map 114 may be stored locally by the vehicle 102 (as shown) or at least accessible to the vehicle 102 via the network 104 (e.g., stored at the remote system 106 and accessible as a map service).

For ease of description, the following examples are described primarily in the context of being executed on the processor 108 of the vehicle 102. The remote system 106 or the plurality of other vehicles 116 may perform similar techniques for updating sensor-based maps in response to identifying criteria for change detections. In other words, the described techniques may be distributed and execute across the components of the environment 100 or executed individually on just the remote system 106 or just the processor 108 of the vehicle 102.

Positions represented by the sensor data 112 and the map 114 may be so accurate that comparing and matching road geometries (e.g., roundabout type, lane width, quantity of lanes) or changes to road-infrastructure (e.g., removal or addition of traffic cones, removal or addition of signs, removal or addition of traffic barriers) can be based on their overlap. This is the basis for change detection theory.

Change detection theory enables the vehicle 102 to deal with rather prominent changes in the environment 100, such as a closed ramp or lane, altered routes, and new roundabouts. However, automated vehicles, such as the vehicle 102, demand higher-definition or greater-detailed reference maps to enable safe and accurate autonomous driving. Detailed features of the reference map 114 are subject to real-world changes because of weather time or a variety of other factors. Changes in these detailed features can be distinguished into two categories by the impact that they have for a use case.

So-called "minor changes" may invalidate the map 114 as being an incorrect representation of the environment 100 or the registered object 118. Minor changes do not impede the final goal of safely navigating and operating the vehicle 102. In contrast, to minor changes, "major changes" restrict or hinder usage of the map 114 and, thus, restrict autonomous driving functionality or inhibit it completely. For example, minor changes occur mostly due to traffic accidents or weather and are thus often unintentional. Examples are pulled-over vehicles, dents, scratches, or divots in guardrails, missing or worn lane-markings, damaged or shifted signs and poles. By definition, these types of minor changes may change the vehicle 102's direction or impede the usability of the map 114 for supporting an autonomous driving mode. Localization systems, which might use such map features as landmarks usually rely on a multitude of those landmarks such that the majority can be assumed to be unchanged and the localization systems still remains functional. Hence, while for such minor changes the map 114 cannot be completely verified, minor changes do not invalidate the map 114 for autonomous driving. Whereas major changes are mainly caused by severe weather, road works or repairs works and unlike minor changes, are intentional or drastic. Examples include resurfacing or renewal of a road, washing away of a road, landslide across a road, an addition of one or more lanes or a reconstruction of a road to update a layout of a road. Nearly all content of the map 114 should be reliable if to be used as reference for localization and navigation. Thus, comprehensive changes of landmarks, like replacement of a guardrail, can also constitute a major change.

Figures 1, 2:
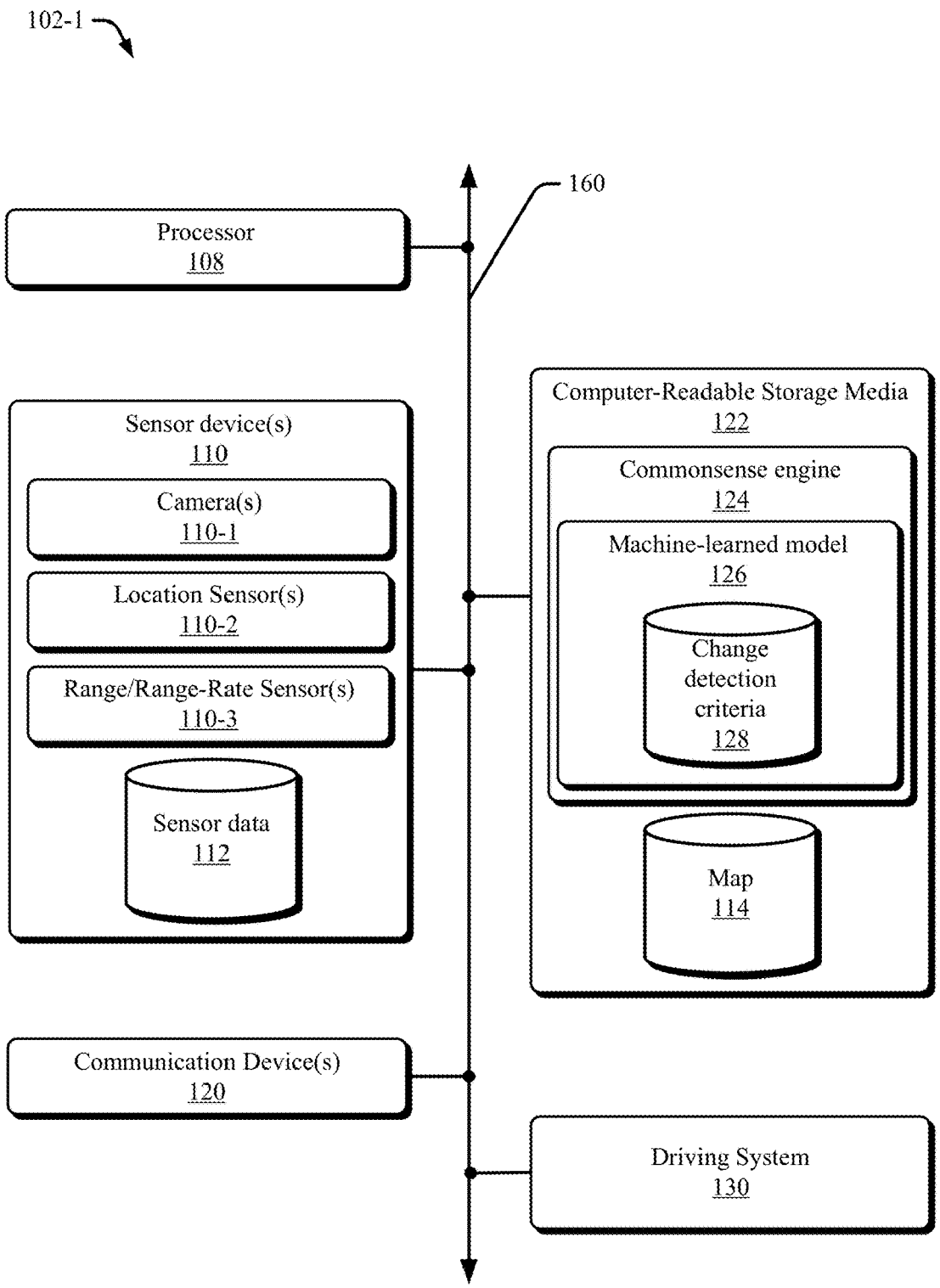

FIG. 1-2 illustrates an example system 102-1 that uses change detection criteria to update sensor-based maps, in accordance with techniques of this disclosure. The system 102-1 is an example of the vehicle 102 and like the vehicle 102, includes the processor 108, the sensor device 110, the sensor data 112, the map 114. Components of the system 102-1 communicate via a bus 160, which may be a wired or wireless communication bus. A communication device 120, a computer-readable storage media 122, and a driving system 130 are coupled to the other components of the system 102-1 via the bus 160. The computer-readable storage media stores a commonsense engine 124, which encompasses a machine-learned model 126 that relies on change detection criteria 128 to determine whether a change to the environment warrants an update to the map 114.

The commonsense engine 124 may be implemented at least partially in hardware, for example, when software associated with the commonsense engine 124 is caused to execute on the processor 108. The commonsense engine 124 can, therefore, include hardware and software, for example, instructions stored on the computer-readable storage media 122 and executed by the processor 108. The commonsense engine 124 constructs the machine-learned model 126, which relies on the change detection criteria 128 to identify major changes needing to be made to the map 114. The machine-learned model 126 constructed by the commonsense engine 124 is configured to identify the change criteria 128 to be used for updating the map 114.

Figures 1, 2, 3:
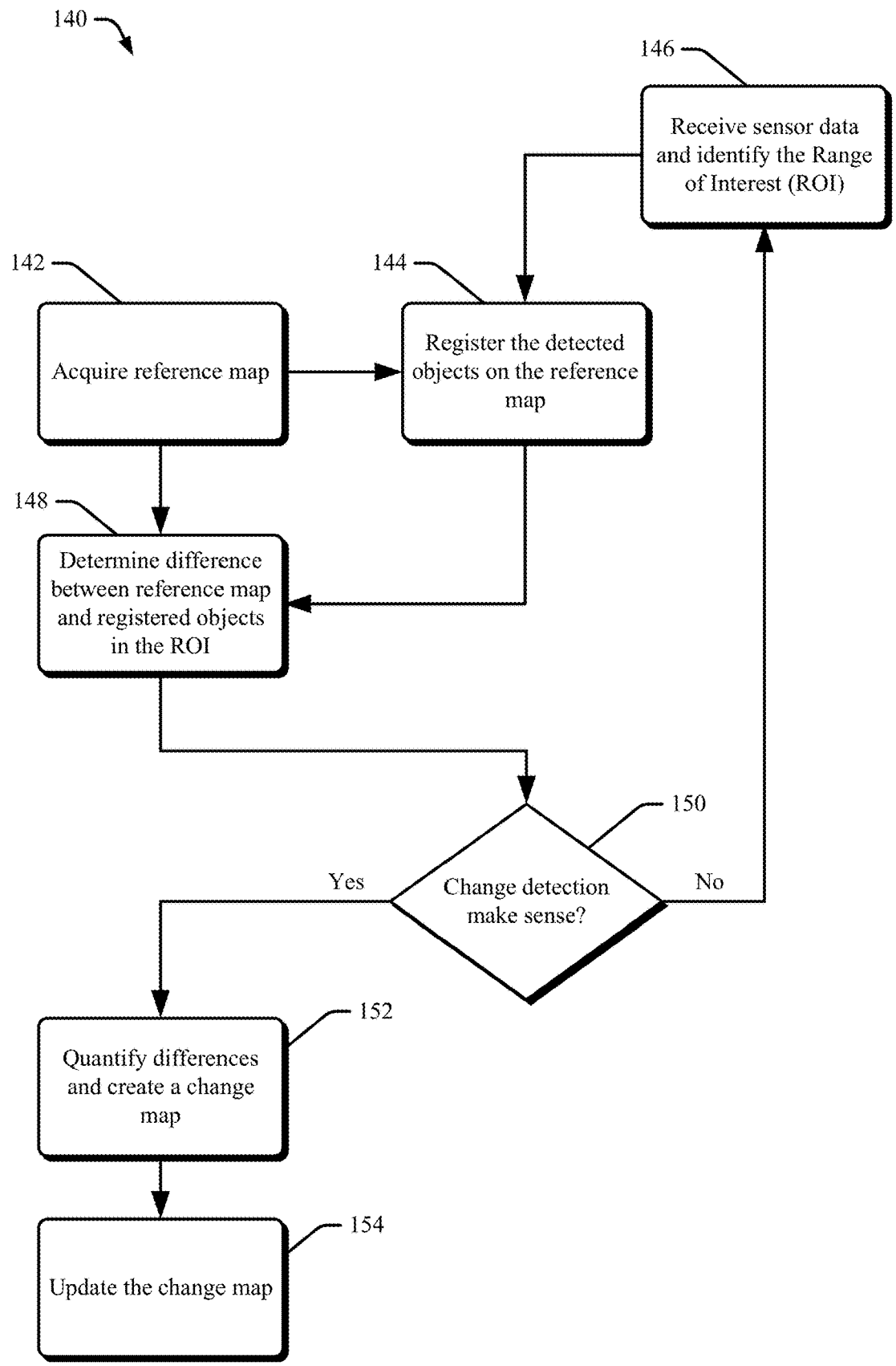
Figures 1, 2:
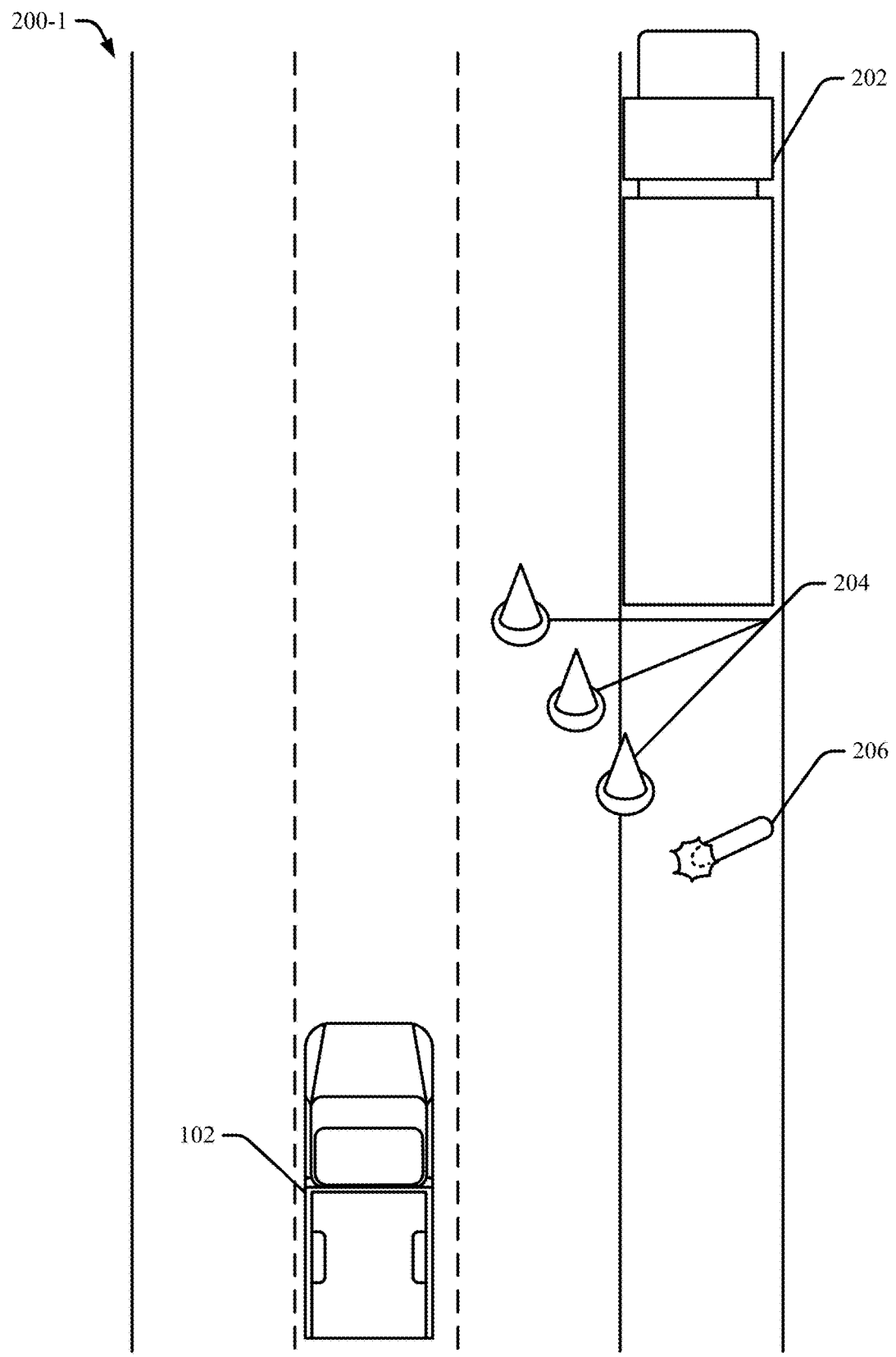
Figure 2:
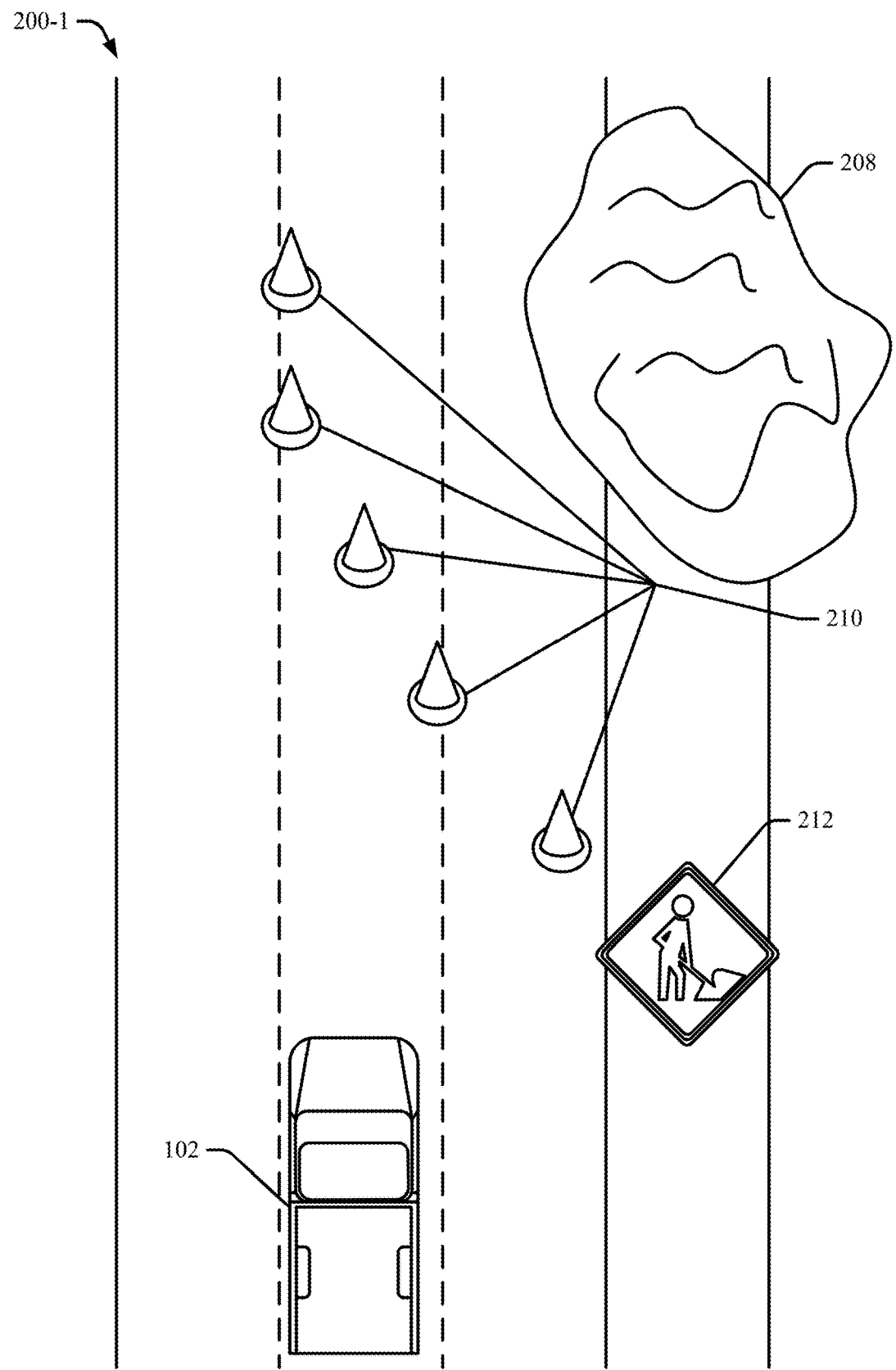
Figure 3:
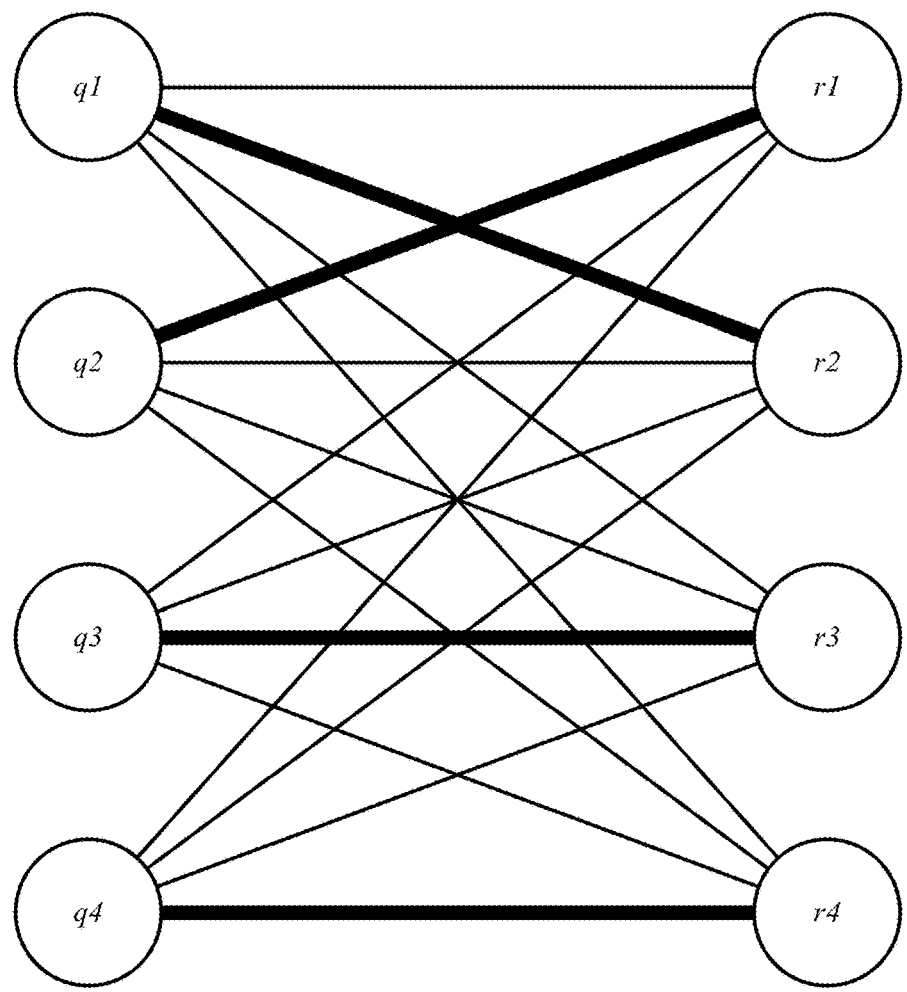

FIG. 1-3 illustrates an example process 140 for using change detection criteria to update sensor-based maps, in accordance with techniques of this disclosure. The process 140 is shown as a set of operations 142 through 154, which may be referred to as acts or steps, and that are performed in, but not limited to, the order or combinations in which the operations are shown or described. Further, any of the operations 142 through 154 may be repeated, combined, or reorganized to provide other methods. In portions of the following discussion, reference may be made to the environment 100 of FIG. 1-1, and entities detailed in FIGS. 1-1 and 1-2, reference to which is made for example only. The techniques are not limited to performance by one entity or multiple entities.

FIG. 1-3 shows how change detection can work, overall. At 142, a reference map is acquired from a sensor device 110 of the vehicle 102. At 144, objects that are detected by the sensor devices 110, such as radar, are registered on the reference map. At 146, the sensor data 112 is received and the commonsense engine 124 executes at the processor 108 to answer natural language and point cloud-based questions in reasoning about commonsense phenomena observed from the sensor data as the vehicle 102 is driving. At 148, the commonsense engine 124 determines differences between the reference map 114 and the registered objects in a region of interest (ROI) associated with the vehicle 102. In other words, the commonsense engine 124 may bound its evaluation of the features of the map 114 for update based on a portion of the sensor data 112, specifically, a portion that indicates one or more objects in the ROI.

At 150, self-supervised learning by the commonsense engine 124 enables it to create its own criteria 128 for checking whether a change detection is sufficient, through pretext tasks in natural language and point cloud-based reasoning. Self-supervised learning is a version of unsupervised learning where data provides the supervision generally, and a neural network is tasked to predict data that is missing for remaining parts. Self-supervised learning enables the commonsense engine 124 to fill-in details indicative of features in the environment 100, that are different than expected, or expected to appear but missing from the sensor data 112. These details are predicted and depending on the quality of the sensor data 112, acceptable semantic features can be obtained without actual labels being applied. If the sensor data 112 includes a change detection that indicates features of the map 114 are sufficiently different from attributes of the sensor data 112, at corresponding locations in the environment 100, then the commonsense engine 124 causes an update to the map 114.

At 152, differences between the sensor data 112 and the map 114 are quantified. And at 154, the map 114 is changed to eliminate or at least reduce the differences between the sensor data 112 and the map 114.

FIGS. 2-1 and 2-2 illustrate example scenarios for using change detection criteria for updating sensor-based maps, in accordance with techniques of this disclosure. The scenarios 200-1 and 200-2 of the FIGS. 2-1 and 2-2 respectively show a geographic and semantic driving-scenario in a two-dimensional birds-eye-view.

In the scenario 200-1 of FIG. 2-1, a tractor trailer 202 is pulled over in a far-right lane as the vehicle 102 travels down a road. The sensor devices 110 of the vehicle 102 detect one or more traffic cones 204 and/or a flare 206, which are laid out on the roadway to alert other drivers to the pulled-over tractor trailer 202. The commonsense engine 124 of the vehicle 102 determines that normally, a pulled-over vehicle like this would occupy at most a single lane. The commonsense engine 124 may determine that the cones 204 are arranged outside the single lane and therefore the cones 204 may constitute a change detection for updating the map 114. However, because they are cones 204 and not a barrier or some other structure, the commonsense engine 124 may refrain from updating the map 114 because the scenario 200-1 is not likely to be a construction zone associated with a major change, and likely to be only a temporary minor change not worth updating the map 114.

In contrast, in the scenario 200-2 of FIG. 2-2, traffic cones 210 for a construction zone 208 with construction signs 212 normally occupy at least one lane. The sensor device 110 of the vehicle 102 may report the construction sign 212 and/or the traffic cones 210 as one or more registered objects identified point cloud portions of the sensor data 112, which in this case, would likely be interpreted by the commonsense engine 124 as being a major change. The ROI for these objects 210 and 212 can be analyzed by the commonsense engine 124 along with scene context, for example, in the form of scene tags and detection tags. This analysis purports to question and resolve challenging visual questions indicative of differences between the objects 210 and 212, and their representation or lack thereof in the map 114, while also providing a rationale justifying these answers.

Conceptually, the commonsense engine 124 may reason in multiple different geographic or semantic spaces. The commonsense engine is a machine-learned model that can process sensor data 112 and therefore "reason" in 2 different scenarios, one geographic and the other semantic. Given the point cloud sensor data 112, a list of registered objects from the sensor data 112, and a question (e.g., "what is this"), the commonsense engine 124 is trained through self-supervision to answer the question and provide a rationale explaining why the answer is correct. Self-supervision enables the commonsense engine 124 to perform a seemingly endless loop learning by answering more and more challenging questions that go beyond mere visual or recognition-level understanding, towards a higher-order cognitive and commonsense understanding of the world depicted by the point cloud from the sensor data 112.

The task of the commonsense engine 124 can be decomposed into two multiple choice subtasks that correspond to answering question q with a response r and justification or rationale. One example of a subtask may include:

1. a point cloud P,
2. a sequence o of object detections. Each object detection $o_i$ consists of a bounding box b, a segmentation mask m, and a class label $l_i \in L$.
3. A query q, posed using a mix of natural language and pointing. Each word $q_i$ in the query is either a word in a vocabulary V, or is a tag referring to an object in o.
4. A set of N responses, where each response $r^{(i)}$ is written in the same manner as the query: with natural language and pointing. Exactly one response is correct.
5. The model chooses a single best response.

In question-answering question q with a response r and justification or rationale, the query is the question q and the responses r can be answer choices. In answer justification or rationale, the query is the concatenated question and correct answer, while the responses are rationale choices.

The commonsense engine 124 may execute two models: one to compute the relevance between a question q and a response, $P_{rel}$, and another to compute the similarity between two response choices, $P_{sim}$. A Bidirectional Encoder Representations from Transformers (BERT) for natural language inference is used. The BERT may be based on convBERT (see https://arxiv.org/pdf/2008.02496.pdf). Given dataset examples $(q_i, r_i)_{1 \leq i \leq N}$, counterfactual can be obtained for each $q_i$ by performing maximum-weight bipartite matching on a weight matrix $W \in R^{N \times N}$, given by $W_{i,j}=\log (P_{rel}(q_i, r_j))+\mu\log (1-P_{sim}(r_i, r_j))$. $\mu>0$ controls the tradeoff between similarity and relevance. To obtain multiple counterfactuals, several bipartite matchings may be performed. To ensure that negatives are diverse, during each iteration, the similarity term may be replaced with the maximum similarity between a candidate response $r_j$ and all responses currently assigned to $q_i$.

BERT and convBERT are but two examples of transformers. Other types of transformers are a uniform cross-modal transformer, which models both image and text representations. Other examples include ViLBERT and LXMERT, which are based on two-stream cross-modal transformers, which bring more specific representations for image and language.

Although primarily described in the context of radar based maps, and language-based self-supervised learning methods, the change detection criteria for updating sensor-based maps described herein can be applied to other sensor-based reference maps (e.g., lidar-based, image-based) where it is desirable to improve accuracy in navigation and control while still conserving processing resources and maintaining a map to be up to date, and other self-supervised learning methods beyond language-based methods may be used. For example, an alternative to LSTM is a neural circuit policy (NCP), which is much more efficient and uses far fewer neurons than LSTM (see https://www.nature.com/articles/s42256-020-00237-3).

In some examples, the commonsense engine 124 employs an adversarial matching technique for creating a robust multiple-choice dataset at scale. An example of such a dataset is conceptualized in FIG. 3.

FIG. 3 is a conceptual diagram illustrating adversarial matching as part of using change criteria for updating sensor-based maps, in accordance with techniques of this disclosure. On the left, circles represent queries q1 through q4 and on the right, circles are used to show potential responses r1 through r4. Incorrect choices are obtained via maximum-weight bipartite matching between the queries q1 through q4 and responses r1 through r4. The weights associated with the pairings of responses and questions are shown as line segments connecting circles; with thick line segments representing higher valued weights compared to thin line segments representing lesser valued weights. The weights are scores from natural language inference models.

Narrowing the gap between recognition (e.g., detecting objects and their attributes) and cognition level (e.g., inferring the likely intents, goals, and social dynamics of moving objects), the common sense engine 124 performs adversarial matching to enable grounding of the meaning of a natural language passage in the sensor data 112, an understanding of the response in the context of the question, and a reasoning over grounded understanding of the question the shared understanding of other questions and answers to recognize meaning from differences in expected versus measured point cloud data, when using the map 114 as a relative baseline for change.

Figures 1, 4:
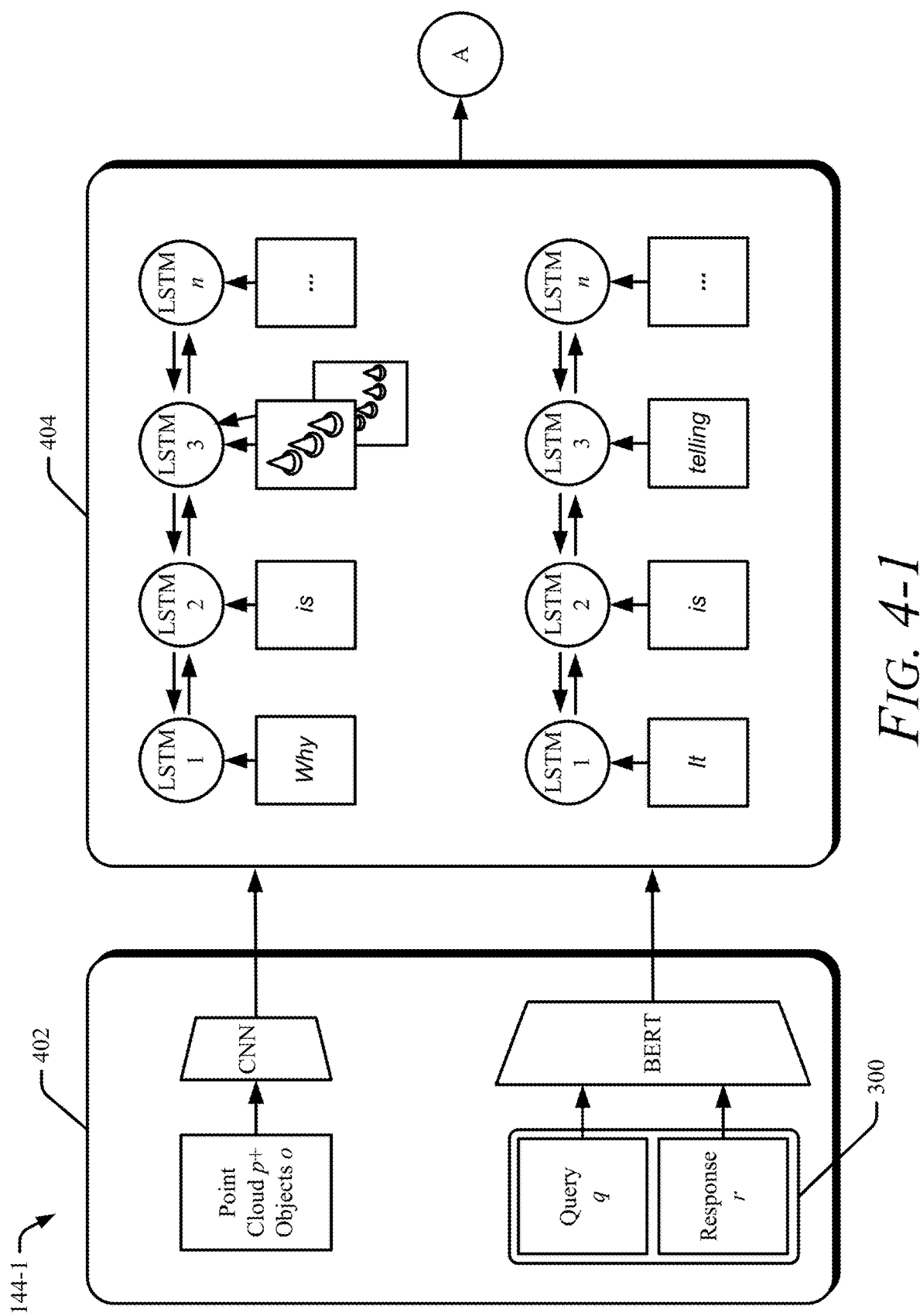
Figures 2, 4:
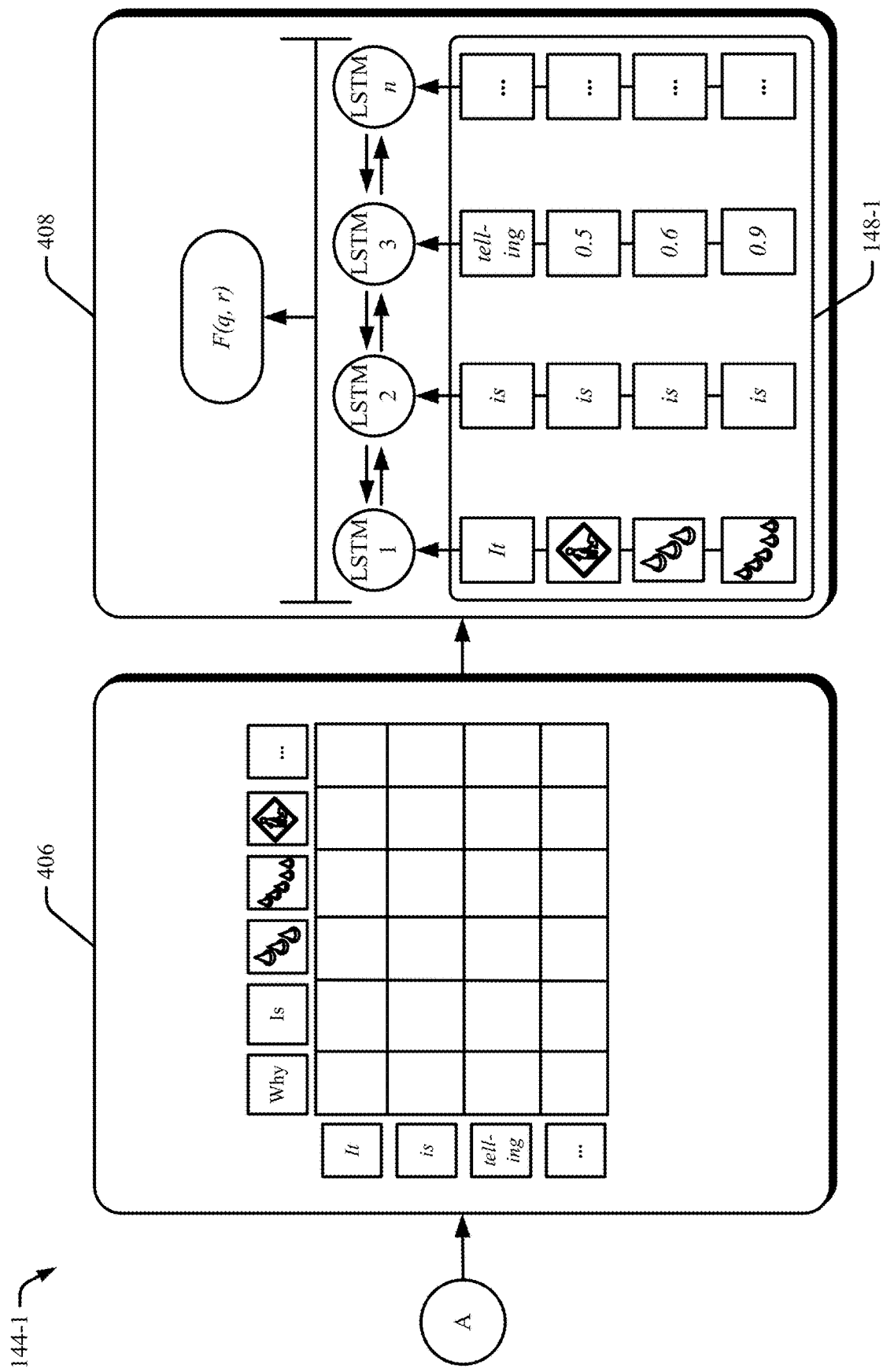

As is explained in the description of FIGS. 4-1 and 4-2, the commonsense engine 124 executes a machine-learned model that performs three inference steps. First, the model grounds the meaning of a natural language passage with respect to objects from the sensor data 112 that are directly referred to. The model then contextualizes the meaning of a response to the question that was asked, as well as global objects from the sensor data 112 that are not mentioned in the question. Finally, the model reasons over this shared representation to arrive at a correct response. The commonsense engine 124 is configured to collect the questions, collect correct answers, and correct rationales through adversarial matching. A way to collect questions and answers to various commonsense reasoning problems at scale is to carefully select interesting situations that involve a lot of different registered objects or otherwise involve scenarios where many things may change.

Adversarial matching involves recycling or repeating each correct answer for a question exactly three times as negative answer for three other questions. Each answer thus has the same probability (25%) of being correct: this resolves the issue of answer-only bias, and disincentivizes machines from always selecting a most generic answer that does not lead to much if any better understanding. The commonsense engine 124 may formulate the answer recycling problem as a constrained optimization based on relevance and entailment scores between each candidate negative answer and a best answer as measured by natural language inference models. This adversarial matching technique allows for any language generation dataset to be turned into a multiple-choice test, while depending on little to no human involvement.

One problem encountered is in obtaining counterfactuals (i.e., incorrect responses to questions), this can be resolved by performing two separate subtasks: ensure counterfactuals are as relevant as possible to context of the environment so the counterfactuals appeal to machine, however, the counterfactuals cannot be overly similar to a correct response to prevent from becoming the correct response, accidentally. Balancing these two objectives to create a training dataset that is challenging for machines, yet easy for humans to verify accuracy. A feature of adversarial matching is that a variable can be used to set the tradeoff between being more difficult for human and machine difficulty, in most examples, the problems should be hard for machines while easy for humans. For example, tuning the variable in one direction can cause questions to become more difficult for the commonsense engine 124 to respond, but easier for an operator to knows through experience and intuition whether the response is correct. This visual understanding of the sensor data 112 can answer questions correctly, however, confidence in the commonsense engine 124 comes from an understanding of rationale the commonsense engine 124 provides for the reasoning.

Thee commonsense engine 124 is configured to provide a rationale that explains why an answer is correct. The questions, answers, and rationales may be kept as a mixture of rich natural language as well as other indications (e.g., detection tags) of cloud data densities and feature shapes. Maintaining the questions, answers, and rationales together in one model enables the commonsense engine 124 to provide an unambiguous link between a textual description of a registered object (e.g., "traffic cone 5") and a corresponding point cloud region of three-dimensional space. To make evaluation straightforward, the commonsense engine 124 frames the ultimate task into stages of answering and justifying, in a multiple-choice setting. For example, given a question q1 along with four answer choices r1 through r4, the commonsense engine 124 model first selects the correct answer. If its answer was correct, then it is provided four rationale choices (not shown) that could purportedly justify the answer being correct, and the commonsense engine 124 select the correct rationale. For the prediction made by the commonsense engine 124 to be correct may depend on both the chosen answer and then the chosen rationale to be correct.

FIG. 4 illustrates an example of a commonsense engine 144-1 for using change detection criteria to update sensor-based maps, in accordance with techniques of this disclosure. The commonsense engine 144-1 is divided into four parts including an initializing component 402, a grounding component 404, a contextualizing component 406, and a reasoning component 408.

The initializing component 402 may include a convolution neural network (CNN) and BERT to learn a joint pointcloud-language representation for each token in a sequence that is passed to the contextualizing component 404. Because both queries and responses can contain a mixture of tags and natural language words, the same grounding component 402 is applied for each (allowing them to share parameters). At the core of the grounding component 402 is a bidirectional LSTM, which at each position is passed as input a word representation for $w_i$, as well as features for $o_{w_i}$. A CNN is used to learn object-level features: the visual representation for each region o is aligned to a ROI from its bounding region. To additionally encode information about the object's class label $l_o$, an embedding of $l_o$ is projected (along with the object's visual features) into a shared hidden representation. The output of the LSTM over all positions be r, for the response and q for the query.

An alternative to a CNN may be used; for example, a Faster R-CNN may extract the visual features (e.g., pooled ROI features for each region), which can encode the localization features for each region via a normalized multiple-dimension array including elements for coordinates (e.g., top, left, bottom, right), dimensions (e.g., width, height, area), and other features. So in an array may include: [x1, y1, x2, y2, w, h, w*h]. Both visual and location features from this array are then fed through a fully connected (FC) layer, to be projected into the same embedding space. The final visual embedding for each region is obtained by summing up two outputs from the FC and then passing that sum through a layer normalization (LN) layer.

Given an initial representation of the query and response, the grounding component 402 uses attention mechanisms to contextualize these sentences with respect to each other and the point cloud context. For each position i in the response, the attended query representation is defined as $\hat{q}_i$ using the following equation:

$$\alpha_{i,j} = \text{softmax}(r_i W q_j) \text{ and } \hat{q}_i = \Sigma_j \alpha_{i,j} q_j.$$

To contextualize an answer, including implicitly relevant objects that have not been picked up from the grounding component 402, another bilinear attention is performed at the contextualizing component 406, between the response r and each object o's features, the result of the object attention be $\hat{o}_i$.

Last, the reasoning component 408 of the machine-learned model 126 of the commonsense engine 124 reasons over the response, attended query, and objects, to output an answer. The reasoning component 408 accomplish this using a bidirectional Long short-term memory (LSTM) that is given as context $\hat{q}_i$, $r_i$, and $\hat{o}_i$ for each position i. For better gradient flow through the network, the output of the reasoning LSTM is concatenated along with the question and answer representations for each timestep: the resulting sequence is max-pooled and passed through a multilayer perceptron, which predicts logic for the query-response compatibility.

In some examples, the neural networks of the machine-learned model 126 may be based on previous models, for example, ResNet50 for image features. To obtain strong representation for language, BERT representations can be used. BERT is applied over an entire question and answer choice, and a feature vector is extracted from the second-to-last layer for each word. The machine-learned model 126 is trained by minimizing the multi-class cross entropy between the prediction for each response $r^i$ and the gold label. It is desirable to provide a fair comparison between the machine-learned model 126 and BERT, so using BERT-Base for each is also a possibility.

A goal of the machine-learned model 126 is to make use of the BERT to be as simple as possible and treating it like a baseline. Given a query q and response choice $r^{(i)}$, both are merged into a single sequence to give to BERT. Each token is the sequence corresponds to a different transformer unit in BERT. Then the later layers can be used in BERT to extract contextualized representations for each token in the query and the response.

This provides a different representation for each response choice i. Frozen BERT representations may be extracted from a second-to-last layer of its transformer. Intuitively, this make sense as the layers are used for both of BERT's pretraining tasks: next sentence prediction (the unit corresponding to the token at the last layer L attends to all units at layer L−1, and uses that to attend to all other units as well). The tradeoff is that precomputing BERT representations substantially reduces the runtime and the machine-learned model 126 to focus on learning more powerful representations.

In some cases it is desirable to include simple settings in the machine-learned model 126 enabling tuning for certain scenarios, and when possible, to use similar configurations for the baselines, particularly with respect to learning rates and hidden state sizes.

Through performance of the described techniques, it has been found, in some examples, that projecting of point cloud features maps a 2176-dimensional hidden size (2048 from ResNet50 and 128-dimensional class embeddings) to a 512-dimensional vector. The grounding component 404 may include a LSTM as a single-layer bidirectional LSTM with a 1280-dimensional input size (768 from BERT and 512 from point cloud features) and use 256 dimensional hidden states. The reasoning component 408 may rely on a LSTM that is a two-layer bidirectional LSTM with a 1536-dimensional input size (512 from point cloud features, and 256 for each direction in the attended, grounded query and the grounded answer). This LSTM may also use 256-dimensional hidden states.

In some examples, the representation from the LSTM of the reasoning component 408, the grounded answer, and the attended question are maxpooled and projected to a 1024-dimensional vector. That vector may be used to predict the ith logit. The hidden-hidden weights of all the LSTMs of the commonsense engine 124 may be set using orthogonal initialization and applied recurrent dropout to the LSTM input with $p_{drop}=0.3$. The model may be optimized with a learning rate of $2*10^{-4}$ and weight decay of $10^{-4}$. Clipping the gradients to have a total $L_2$ norm can lower the learning rate by a factor of two when a plateau (validation accuracy not increasing for two epochs in a row) appears. In some examples, each model can be trained for 20 epochs.

Figure 5:
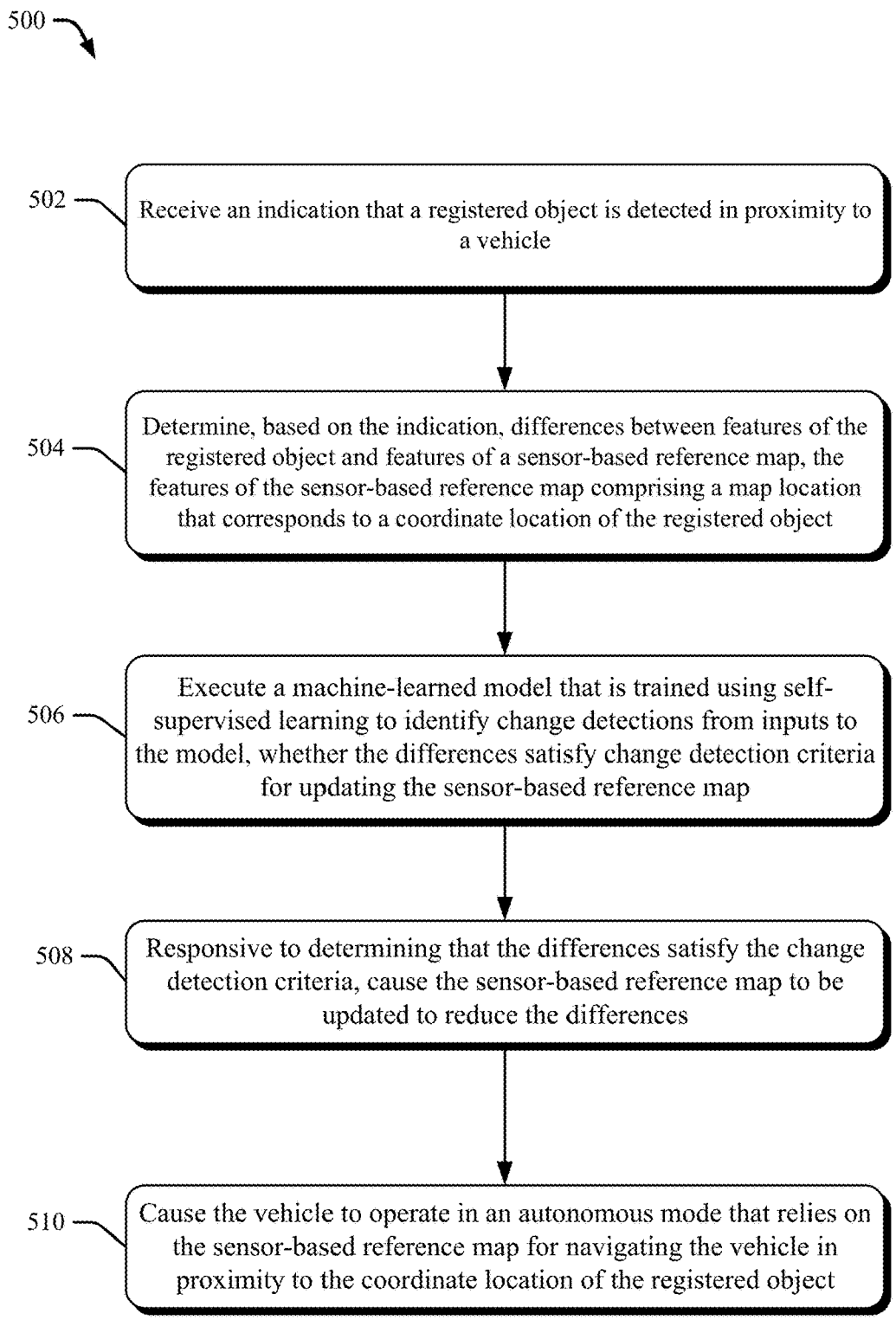
FIG. 5 illustrates another example process for using change detection criteria to update sensor-based maps, in accordance with techniques of this disclosure.

FIG. 5 illustrates another example process for using change detection criteria to update sensor-based maps, in accordance with techniques of this disclosure. The process 500 is shown as a set of operations 502 through 510, which are performed in, but not limited to, the order or combinations in which the operations are shown or described. Further, any of the operations 502 through 510 may be repeated, combined, or reorganized to provide other methods, such as the process 120. In portions of the following discussion, reference may be made to the environment 100 and entities detailed in above, reference to which is made for example only. The techniques are not limited to performance by one entity or multiple entities.

At 502, an indication that a registered object is detected in proximity to a vehicle. For example, the sensor device 110 generates the sensor data 112, including point cloud data of the environment 100 and the object 118. The processor 108 obtains the sensor data 112 via the bus 160.

At 504, based on the indication, differences between features of the registered object and features of a sensor-based reference map are determined. The features of the sensor-based reference map include a map location that corresponds to a coordinate location of the registered object. For example, portions of the sensor data 112 and portions of the map 114 can overlap the same coordinate locations; differences between features at the same coordinate locations indicate possible change detections that justify updating the map 114.

At 506, a machine-learned model that is trained using self-supervised learning to identify change detections from inputs to the model execute. For example, the processor 108 executes the commonsense engine 124, which compares the differences to change detection criteria. The commonsense engine 124 may be designed for updating the map 114, which may be a radar-based reference map or any sensor-based reference map. The map 114 may include multiple layers, each layer being for a different sensor. For example, a first layer for recording radar-based features may align and match with a second layer, such as a lidar layer or a camera layer, that record features that align with the features of the first layer.

At 508, responsive to determining that the differences satisfy the change detection criteria, cause the sensor-based reference map to be updated to reduce the differences. For example, the commonsense engine 124 relies on the change detection criteria 128 to determine whether to update the map 114 in response to a particular change detection. Differences can be observed between features of the sensor data 112 and the map 114 at common coordinate locations. These differences can be identified inconsistencies between the sensor data 112 and the map 114 around things such as:

Expected range from the vehicle 102 to a center island and barrier, which can be useful in inferring a roundabout type;

Expected range from the vehicle 102 and a side-by-side barrier, which can be useful to determine a lane width and a quantity of lanes;

Expected barrier curvatures for ramp curvatures;

Expected range between traffic cone and an overall shape of the traffic cones;

Expected range to other traffic barriers and a range to a guardrail for traffic barriers;

Expected traffic signs;

When the sensor data 112 includes radar data, differences can be identified in some features that are unique to radar, which if exploited enable more accurate identifications of change detections in a radar layer of the map 114. These radar features can include:

Expected Signal of strength
Expected peak sidelobe ratio
Expected signal noise ratio
Expected radar cross section
Expected constant false alarm rate
Expected transmit/receive antenna gain
Expected static object detection
vegetation
embankment
bridge expansion
speedbumps, manholes, or drains The scenarios 200-1 and 200-2 of the FIGS. 2-1 and 2-2 respectively show a geographic and semantic driving-scenario in a two-dimensional birds-eye-view.

At 510, the vehicle is caused to operate in an autonomous mode that relies on the sensor-based reference map for navigating the vehicle in proximity to the coordinate location of the registered object. For example, the vehicle 102 avoids the construction zone 208, the cones 210, and the sign 212 in response to recognizing a construction zone, which through updating the map 114, the commonsense engine 124 causes features of the construction zone 208 to show up in the sensor-based reference map 114. In this way, the techniques of this disclosure enable use of point clouds, that have detailed features in both geometric and semantic (e.g., safety) layers. Self-supervised learning enables a commonsense engine capable of creating its own supervision through questions and response to pretext tasks.

FIGS. 6-1, 6-2, 7-1, 7-2, 8-1, 8-2, 9-1, and 9-2 illustrate additional example scenarios for using change detection criteria for updating sensor-based maps, in accordance with techniques of this disclosure. The scenarios 600-1, 600-2, 700-1, 700-2, 800-1, 800-2, 900-1, and 900-2 of the FIGS. 6-1, 6-2, 7-1, 7-2, 8-1, 8-2, 9-1, and 9-2 show a driving-scenario in a three-dimensional perspective-view.

Figures 1, 6:
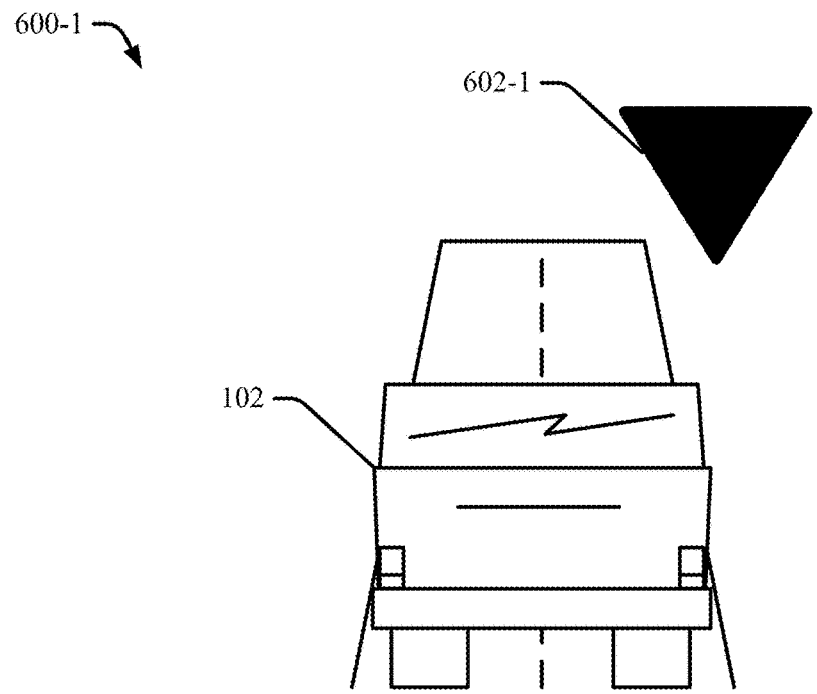
Figures 2, 6:
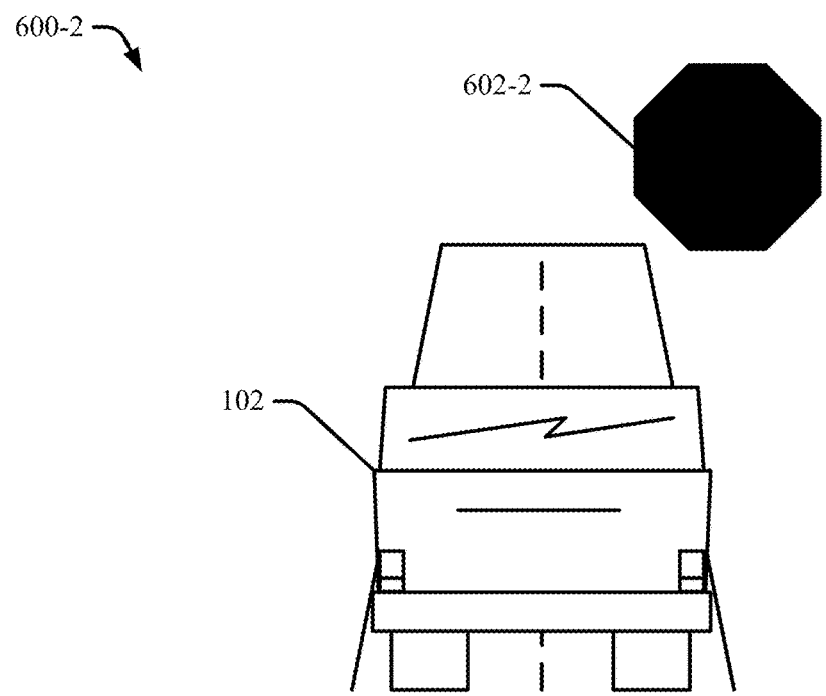

In the scenario 600-1 of FIG. 6-1, a traffic sign 602-1 is off to the right-hand side of a road being traveled by the vehicle 102. The commonsense engine 124 of the vehicle 102 determines that normally, this sign is a yield sign. Turning next to FIG. 6-2, at a later time, when the vehicle 102 travels down the same road for a second time, the commonsense engine 124 of the vehicle 102 expects to see the yield sign 602-1 but instead detects a different sign 602-2, e.g., a stop sign. The ROI for the traffic sign 602-2 can be analyzed by the commonsense engine 124 along with scene context, for example, in the form of scene tags and detection tags. This analysis resolves visual differences between the traffic sign 602-1 and 602-2, and their representation or lack thereof in the map 114, while also providing a rationale. The commonsense engine 124 may determine that a road change has occurred in response to identifying a change from the sign 602-1 to 602-2 (yield to stop); the sign change constitutes a road change detection for updating the map 114, and the commonsense engine 124 may cause the change to the map 114.

Figures 1, 7:
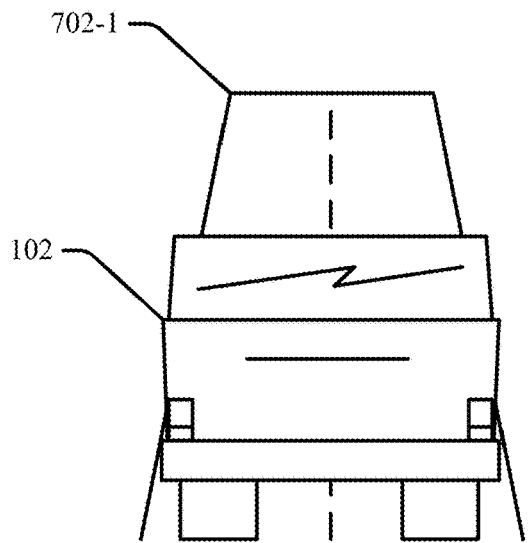
Figures 2, 7:
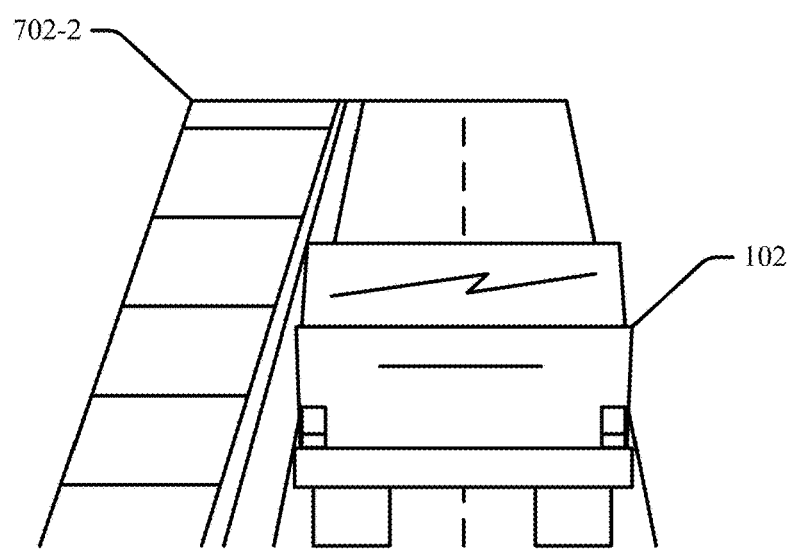

In the scenario 700-1 of FIG. 7-1, the vehicle 102 travels on a road 702-1. The commonsense engine 124 of the vehicle 102 determines that normally, this road 702-1 has no sidewalk or shoulder. Turning next to FIG. 7-2, at a later time, when the vehicle 102 travels down the same road for a second time, the commonsense engine 124 of the vehicle 102 expects to see features of the road 702-1 or an absence of features (e.g., no shoulder, no sidewalk) but instead detects a road 702-2, which includes a shoulder and sidewalk. The ROI for the road 702-2 can be analyzed by the commonsense engine 124 along with scene context, for example, in the form of scene tags and detection tags. This analysis resolves visual differences between the road 702-1 and 702-2. The commonsense engine 124 may determine the adding of a shoulder and sidewalk to the side of the road 702-1 to create the road 702-2 constitutes another road change detection for updating the map 114, and the commonsense engine 124 may cause the change to the map 114.

Figures 1, 8:
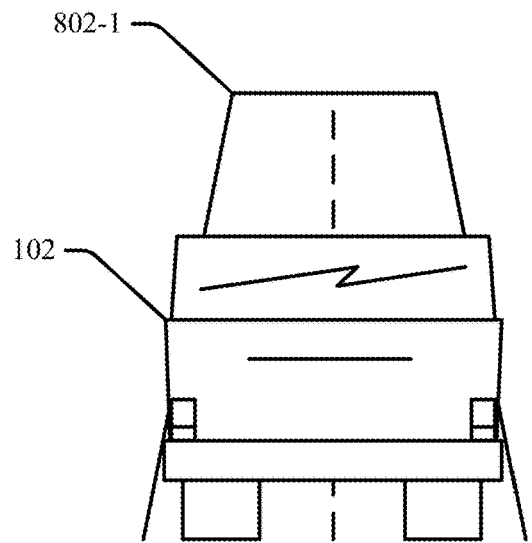
Figures 2, 8:
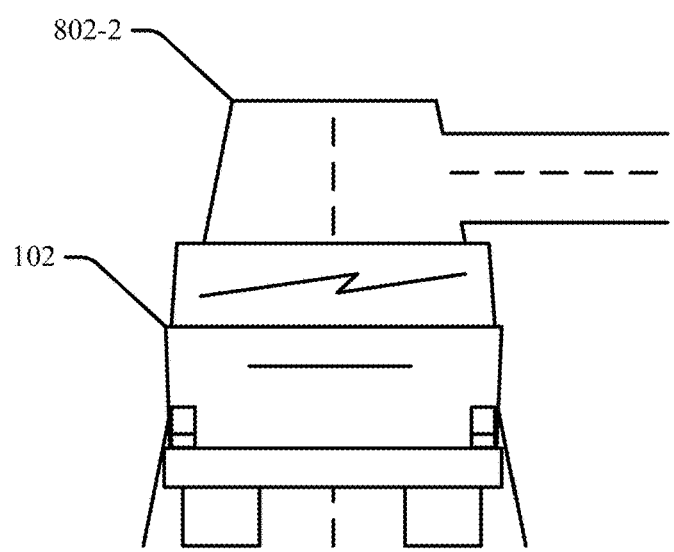

In the scenario 800-1 of FIG. 8-1, the vehicle 102 travels on a road 802-1. The commonsense engine 124 of the vehicle 102 determines that normally, this road 802-1 has no intersection. Turning next to FIG. 8-2, at a later time, when the vehicle 102 travels down the same road for a second time, the commonsense engine 124 of the vehicle 102 expects to see an absence of an intersection but instead detects a road 802-2, which includes an intersection to another street. The ROI for the road 802-2 can be analyzed by the commonsense engine 124 along with scene context, for example, in the form of scene tags and detection tags. This analysis resolves visual differences between the road 802-1 and 802-2. The commonsense engine 124 may determine the intersection in the road 802-2 constitutes a third road change detection for updating the map 114, and the commonsense engine 124 may cause the change to the map 114.

Figures 1, 9:
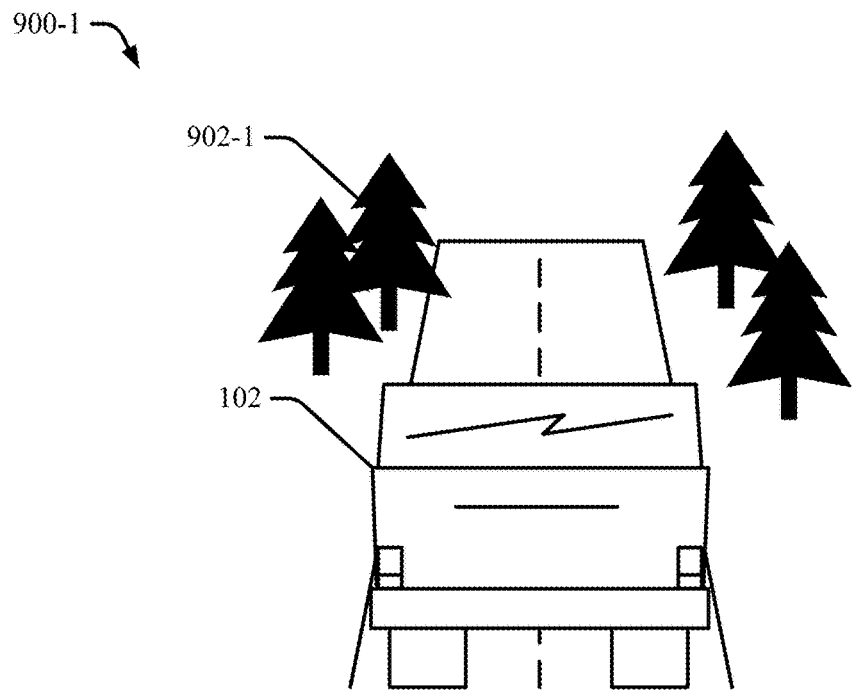
Figures 2, 9:
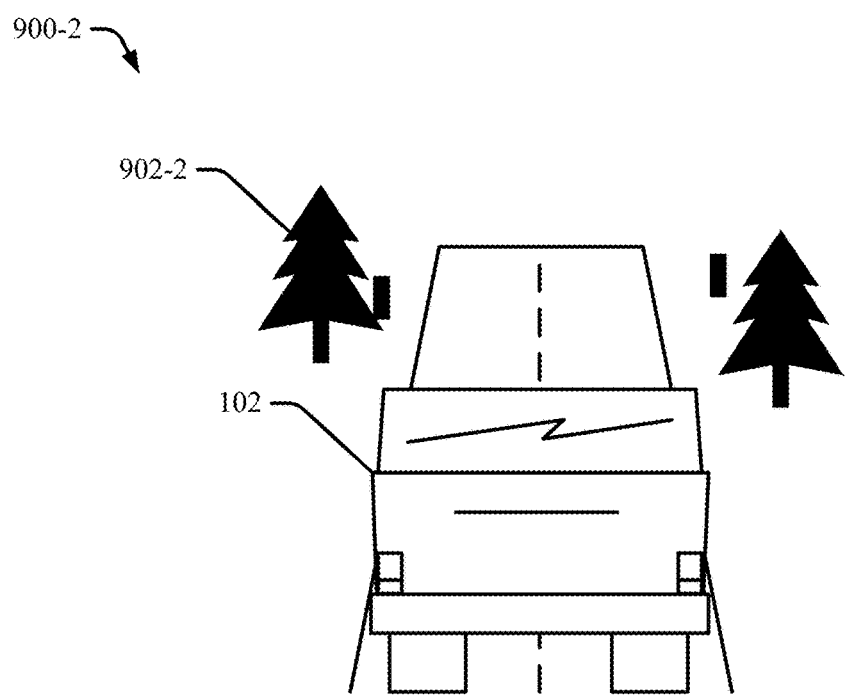

Now, different from the scenarios 600-1, 600-2, 700-1, 700-2, 800-1, and 800-2, in the scenarios 900-1 and 900-2 of FIGS. 9-1 and 9-2, no update to the map 114 may be made because instead of a road change detection, the scenarios 900-1 and 900-2 show a vegetation change detection. The vehicle 102 travels on a road lined by vegetation 902-1. The commonsense engine 124 of the vehicle 102 determines that normally, this road has the vegetation 902-1 composed of fir trees on either side of the road, in particular, close to the road. Turning next to FIG. 9-2, at a later time, when the vehicle 102 travels down the same road for a second time, the commonsense engine 124 of the vehicle 102 expects to see the vegetation 902-1 but instead detects different vegetation 902-2 lining the side of the road, which has fewer trees than the vegetation 902-1. The ROI for the vegetation 902-2 can be analyzed by the commonsense engine 124 along with scene context, for example, in the form of scene tags and detection tags. This analysis resolves visual differences between the vegetation 902-1 and 902-2. The commonsense engine 124 may determine the vegetation 902-2 is not a change for updating the map 114, but instead, merely constitutes a vegetation change detection and refrain from updating the vegetation change to the map 114. In other word, FIGS. 9-1 and 9-2 are example scenarios for identifying the region of interest (e.g., everything excluding the vegetation 902-1, 902-2) and it being filtered out. In other scenarios, the map 114 may include vegetation (e.g., for navigating off-road in a national park or uninhabited region) and in such a case, the vegetation change can cause an update to the map 114, similar to a road change.

ADDITIONAL EXAMPLES

In the following section, additional examples of change detection criteria for updating sensor-based maps are provided.

Example 1. A method comprising: receiving, from a sensor device of a vehicle, an indication that a registered object is detected in proximity to the vehicle; determining, by a processor of the vehicle, based on the indication, differences between features of the registered object and features of a sensor-based reference map, the features of the sensor-based reference map comprising a map location that corresponds to a coordinate location of the registered object; executing, by the processor, a machine-learned model that is trained using self-supervised learning to identify change detections from inputs to the model, whether the differences satisfy change detection criteria for updating the sensor-based reference map; responsive to determining that the differences satisfy the change detection criteria, causing, by the processor, the sensor-based reference map to be updated to reduce the differences; and causing, by the processor, the vehicle to operate in an autonomous mode that relies on the sensor-based reference map for navigating the vehicle in proximity to the coordinate location of the registered object.

Example 2. The method of example 1, wherein the sensor device comprises a radar device and the sensor-based reference map comprises a reference map at least partially derived from radar data.

Example 3. The method of example 1 or 2, wherein the sensor device comprises a lidar device and the sensor-based reference map comprises a reference map at least partially derived from point cloud data.

Example 4. The method of any of the preceding examples, further comprising: causing, by the processor, the machine-learned model to train using self-supervised learning by generating multiple change detection criteria for determining whether to update the sensor-based reference map.

Example 5. The method of example 4, wherein generating the multiple change detection criteria for determining whether to update the sensor-based reference map comprises self-supervised learning based on training data that includes pretext tasks in a natural language.

Example 6. The method of example 4 or 5, wherein generating the multiple change detection criteria for determining whether to update the sensor-based reference map comprises self-supervised learning based on training data that further includes sensor-based questions and answers.

Example 7. The method of example 6, wherein the sensor-based questions and answers include questions and answers related to point cloud data indicative of three-dimensional features of registered objects located at various map locations in an environment.

Example 8. The method of example 1, wherein the map location comprises a three-dimensional region of space, and the coordinate location of the registered object comprises a three-dimensional coordinate location in space.

Example 9. A computer-readable storage medium comprising instructions that, when executed, cause a processor of a vehicle system to: receive, from a sensor device of a vehicle, an indication that a registered object is detected in proximity to the vehicle; determine, based on the indication, differences between features of the registered object and features of a sensor-based reference map, the features of the sensor-based reference map comprising a map location that corresponds to a coordinate location of the registered object; execute a machine-learned model that is trained using self-supervised learning to identify change detections from inputs to the model, whether the differences satisfy change detection criteria for updating the sensor-based reference map; responsive to determining that the differences satisfy the change detection criteria, cause the sensor-based reference map to be updated to reduce the differences; and cause the vehicle to operate in an autonomous mode that relies on the sensor-based reference map for navigating the vehicle in proximity to the coordinate location of the registered object.

Example 10. The computer-readable storage medium of example 9, wherein the sensor device comprises a radar device and the sensor-based reference map comprises a reference map at least partially derived from radar data.

Example 11. The computer-readable storage medium of example 9, wherein the sensor device comprises a lidar device and the sensor-based reference map comprises a reference map at least partially derived from point cloud data.

Example 12. The computer-readable storage medium of example 9, wherein the instructions, when executed, further cause the processor of the vehicle system to: cause the machine-learned model to train using self-supervised learning by generating multiple change detection criteria for determining whether to update the sensor-based reference map.

Example 13. The computer-readable storage medium of example 12, wherein the instructions, when executed, cause the processor to generate the multiple change detection criteria for determining whether to update the sensor-based reference map using self-supervised learning based on training data that includes pretext tasks in a natural language.

Example 14. The computer-readable storage medium of example 13, wherein the instructions, when executed, cause the processor to generate the multiple change detection criteria for determining whether to update the sensor-based reference map using self-supervised learning based on additional training data that includes sensor-based questions and answers.

Example 15. The computer-readable storage medium of example 14, wherein the sensor-based questions and answers include questions and answers related to point cloud data indicative of three-dimensional features of registered objects located at various map locations in an environment.

Example 16. The computer-readable storage medium of example 9, wherein the map location comprises a three-dimensional region of space, and the coordinate location of the registered object comprises a three-dimensional coordinate location in space.

Example 17. A system, the system comprising: a processor configured to: receive, from a sensor device of a vehicle, an indication that a registered object is detected in proximity to the vehicle; determine, based on the indication, differences between features of the registered object and features of a sensor-based reference map, the features of the sensor-based reference map comprising a map location that corresponds to a coordinate location of the registered object; execute a machine-learned model that is trained using self-supervised learning to identify change detections from inputs to the model, whether the differences satisfy change detection criteria for updating the sensor-based reference map; responsive to determining that the differences satisfy the change detection criteria, cause the sensor-based reference map to be updated to reduce the differences; and cause the vehicle to operate in an autonomous mode that relies on the sensor-based reference map for navigating the vehicle in proximity to the coordinate location of the registered object.

Example 18. The system of example 17, wherein the sensor device comprises a radar device and the sensor-based reference map comprises a reference map at least partially derived from radar data.

Example 19. The system of example 17, wherein the sensor device comprises a lidar device and the sensor-based reference map comprises a reference map at least partially derived from point cloud data.

Example 20. The system of example 17, wherein the processor is further configured to: cause the machine-learned model to train using self-supervised learning by generating multiple change detection criteria for determining whether to update the sensor-based reference map.

CONCLUSION

While various embodiments of the disclosure are described in the foregoing description and shown in the drawings, it is to be understood that this disclosure is not limited thereto but may be variously embodied to practice within the scope of the following claims. From the foregoing description, it will be apparent that various changes may be made without departing from the spirit and scope of the disclosure as defined by the following claims. Complexities and delays associated with updating reference maps, especially when considering all possible change detections that may happen, may be overcome through reliance on the described change detection criteria, which in addition to improving performance, also fosters driving-safety.

The use of "or" and grammatically related terms indicates non-exclusive alternatives without limitation unless the context clearly dictates otherwise. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

What is claimed is:
1. A method comprising:
    receiving, by a processor of a vehicle and based on information from a sensor device, an indication that a plurality of registered objects are detected in proximity to the vehicle;

determining, by the processor, based on the indication, differences between features of the plurality of registered objects and features of a sensor-based reference map, the features of the sensor-based reference map comprising map locations that correspond to coordinate locations of the plurality of registered objects;

executing, by the processor, a machine-learned model to determine whether the differences between the features of the plurality of registered objects and features of the sensor-based reference map justify updating the sensor-based reference map by answering contextual questions about the plurality of registered objects and providing rationales justifying answers to the contextual questions;

responsive to determining that the differences between the features of the plurality of registered objects and features of the sensor-based reference map justify updating the sensor-based reference map, causing, by the processor, the sensor-based reference map to be updated to reduce the differences; and causing, by the processor, the vehicle to operate in an autonomous mode that relies on the sensor-based reference map for navigating the vehicle in proximity to the coordinate locations of the plurality of registered objects.

2. The method of claim 1, wherein the sensor device comprises a radar device and the sensor-based reference map comprises a reference map at least partially derived from radar data.

3. The method of claim 1, wherein the sensor device comprises a lidar device and the sensor-based reference map comprises a reference map at least partially derived from point cloud data.

4. The method of claim 1, wherein the map locations comprise three-dimensional regions of space, and the coordinate locations of the plurality of registered objects comprise three-dimensional coordinate locations in space.

5. A non-transitory computer-readable storage medium comprising instructions that, when executed, cause a processor of a vehicle system to:

receive, based on information from a sensor device, an indication that a plurality of registered objects are detected in proximity to the vehicle;

determine, based on the indication, differences between features of the plurality of registered objects and features of a sensor-based reference map, the features of the sensor-based reference map comprising map locations that correspond to coordinate locations of the plurality of registered objects; execute a machine-learned model to determine whether the differences between the features of the plurality of registered objects and features of the sensor-based reference map justify updating the sensor-based reference map by answering contextual questions about the plurality of registered objects and providing rationales justifying answers to the contextual questions;

responsive to determining that the differences between the features of the plurality of registered objects and features of the sensor-based reference map justify updating the sensor-based reference map, cause the sensor-based reference map to be updated to reduce the differences; and cause the vehicle to operate in an autonomous mode that relies on the sensor-based reference map for navigating the vehicle in proximity to the coordinate locations of the plurality of registered objects.

6. The non-transitory computer-readable storage medium of claim 5, wherein the sensor device comprises a radar device and the sensor-based reference map comprises a reference map at least partially derived from radar data.

7. The non-transitory computer-readable storage medium of claim 5, wherein the sensor device comprises a lidar device and the sensor-based reference map comprises a reference map at least partially derived from point cloud data.

8. The non-transitory computer-readable storage medium of claim 5, wherein the map locations comprise three-dimensional regions of space, and the coordinate locations of the plurality of registered objects comprise three-dimensional coordinate locations in space.

9. A system, the system comprising:
a processor configured to:
receive, based on information from a sensor device, an indication that a plurality of registered objects are detected in proximity to the vehicle;

determine, based on the indication, differences between features of the plurality of registered objects and features of a sensor-based reference map, the features of the sensor-based reference map comprising map locations that correspond to coordinate locations of the plurality of registered objects;

execute a machine-learned model to determine whether the differences between the features of the plurality of registered objects and features of the sensor-based reference map justify updating the sensor-based reference map by answering contextual questions about the plurality of registered objects and providing rationales justifying answers to the contextual questions;

responsive to determining that the differences between the features of the plurality of registered objects and features of the sensor-based reference map justify updating the sensor-based reference map, cause the sensor-based reference map to be updated to reduce the differences; and cause the vehicle to operate in an autonomous mode that relies on the sensor-based reference map for navigating the vehicle in proximity to the coordinate locations of the plurality of registered objects.

10. The system of claim 9, wherein the sensor device comprises a radar device and the sensor-based reference map comprises a reference map at least partially derived from radar data.

11. The system of claim 9, wherein the sensor device comprises a lidar device and the sensor-based reference map comprises a reference map at least partially derived from point cloud data.

12. The method of claim 1, wherein the determining that the differences between the features of the plurality of registered objects and features of the sensor-based reference map justify updating the sensor-based reference map comprises determining that the differences between the features of the plurality of registered objects and features of the sensor-based reference map are intentional changes.

13. The method of claim 1, wherein the answering contextual questions about the plurality of registered objects and providing rationales justifying answers to the contextual questions comprises adversarial matching.

14. The method of claim 1, wherein the contextual questions comprise questions about relative locations between groups of registered objects of the plurality of registered objects.

15. The method of claim 1, wherein the contextual questions comprise questions about shapes of the plurality of registered objects.

16. The method of claim 1, wherein the contextual questions are not object-recognition questions.

17. The method of claim 1, wherein the contextual questions comprise natural language and referring to at least one of the plurality of registered objects.

18. The system of claim 9, wherein the answering contextual questions about the plurality of registered objects and providing rationales justifying answers to the contextual questions comprises adversarial matching.

19. The system of claim 9, wherein the contextual questions comprise questions about relative locations between groups of registered objects of the plurality of registered objects.

20. The system of claim 9, wherein the contextual questions comprise natural language and referring to at least one of the plurality of registered objects.

\* \* \* \* \*